S. PALMATIER.
Whiffletree.

No. 218,309. Patented Aug. 5, 1879.

Witnesses:
Fred K Haynes
Edw. P. Jessup.

Inventor:
Stanton Palmatier
by his Attorneys
Brown & Brown

UNITED STATES PATENT OFFICE.

STANTON PALMATIER, OF LEEDS, NEW YORK, ASSIGNOR OF ONE-HALF HIS RIGHT TO FRANCIS PALMATIER, OF SAME PLACE.

IMPROVEMENT IN WHIFFLETREES.

Specification forming part of Letters Patent No. 218,309, dated August 5, 1879; application filed March 6, 1879.

*To all whom it may concern:*

Be it known that I, STANTON PALMATIER, of Leeds, in the county of Greene and State of New York, have invented certain new and useful Improvements in Whiffletrees and Eveners, of which the following is a specification.

My invention consists in a whiffletree composed of two metal tubes, connected by end pieces, provided with projections inserted and secured in the ends of the tubes, whereby a very light and durable whiffletree or evener is produced.

It also consists in the combination, with a whiffletree or evener composed of two metal tubes or bars, of springs arranged upon the said braces, and so combined with a draft device or hook as to permit the yielding of the said draft device in starting a vehicle to which the said whiffletree is connected.

Figure 1:
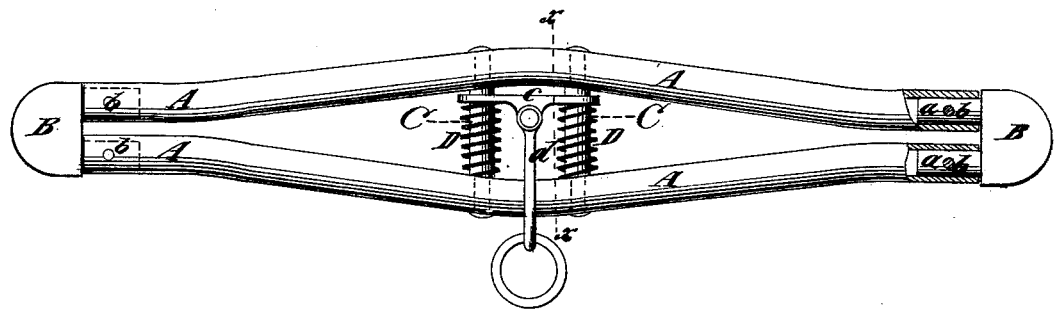
Figure 2:
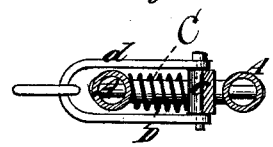

In the accompanying drawings, Figure 1 represents a plan view of a whiffletree embodying my improvements; and Fig. 2, a transverse section thereof on the dotted line $x\,x$, Fig. 1.

Similar letters of reference designate corresponding parts in both figures.

Although my invention is here shown as embodied in a whiffletree, it may be also applied to eveners and neck-yokes for use in connection with a double wagon.

A A designate the metal tubes of which the whiffletree is composed. These may be very advantageously made of ordinary wrought-iron gas-pipe, and are represented as slightly bent outward from each end toward the center, so as to aid in bracing each other laterally.

For connecting the tubes A A at their ends I have shown end pieces, B, of malleable iron or other tough metal. I have here represented these end pieces as provided with projections $a$, inserted in the ends of the tubes, and secured therein by means of shrinking, or in any other convenient manner.

I have shown pins $b$ passing transversely through the tubes and projections $a$, to more effectually secure the ends of the tubes to the end pieces, B.

In lieu of the projections $a$, the end pieces may be furnished with sockets or recesses, in which the ends of the tubes may be inserted and secured.

C C designate braces extending transversely from one tube to the other, and serving to brace them laterally. These braces may be provided with shoulders, to keep the tubes a proper distance apart, and may be secured in place by riveting the ends.

D D designate spiral springs arranged upon the braces C C, and impinging upon a cross-piece or yoke, $c$, which is supported upon and properly guided by the braces C C. To the cross-piece or yoke $c$ is secured a draft device or hook, $d$, which may be connected to a vehicle upon which the whiffletree is to be used.

A pull upon the whiffletree serves to compress the springs D D, and eases the starting of a vehicle.

This yielding draft device is applicable to whiffletrees and eveners composed of two bars, whether hollow or not, united at their ends.

By my invention I produce a metal whiffletree which may be made very light and of great strength, and a yielding draft apparatus of very simple construction for use therewith.

What I claim as my invention, and desire to secure by Letters Patent, is—

1. A whiffletree or evener composed of two metal tubes, connected by end pieces, provided with projections inserted and secured in the ends of the said tubes, substantially as specified.

2. The combination, with a whiffletree or evener composed of two metal tubes or bars, connected by lateral braces, of springs arranged upon said braces, a yoke supported upon said braces and guided thereby, and a draft device or hook connected to said yoke, substantially as and for the purpose specified.

STANTON PALMATIER.

Witnesses:
E. A. CHASE,
W. IRVING JENNINGS.